United States Patent [19]

Aronson

[11] 4,369,956

[45] Jan. 25, 1983

[54] SELF-CENTERING FIXTURE

[76] Inventor: Orvil R. Aronson, 620 N. Riverside, St. Clair, Mich. 48079

[21] Appl. No.: 207,286

[22] Filed: Nov. 17, 1980

[51] Int. Cl.[3] .............................................. B23Q 3/08

[52] U.S. Cl. ...................................... 269/34; 269/235; 269/238; 269/282; 269/283

[58] Field of Search ............... 269/235, 232, 229, 230, 269/238, 34, 282, 283

[56] References Cited

U.S. PATENT DOCUMENTS

| | | | |
|---|---|---|---|
| 1,485,731 | 3/1924 | Stangbye | 269/229 |
| 1,866,125 | 7/1932 | Patterson | 269/283 |
| 2,620,693 | 12/1952 | Eslich | 269/229 |
| 2,850,926 | 9/1958 | Jobe | 269/229 |
| 3,232,601 | 2/1966 | Long et al. | 269/238 |
| 3,774,897 | 11/1973 | Klancnik | 269/34 |

FOREIGN PATENT DOCUMENTS

| | | | |
|---|---|---|---|
| 644815 | 7/1964 | Belgium | 269/235 |

*Primary Examiner*—Robert C. Watson

*Attorney, Agent, or Firm*—Burton, Parker & Schramm

[57] ABSTRACT

A self-centering fixture makes use of an air actuated motor which is drivingly rotated in one direction. The fixture has a pair of levers pivoted to a base. As the motor is actuated, a cam positioned between the longer arms of each lever rotates and acts to move the longer arms apart. Thus, on the other side of the pivot, jaws on the shorter arms move towards one another to grasp the workpiece. The workpiece is released by reversely activating the motor. Since the cam is counteracted by springs which pull the long ends together, the jaws open.

2 Claims, 6 Drawing Figures

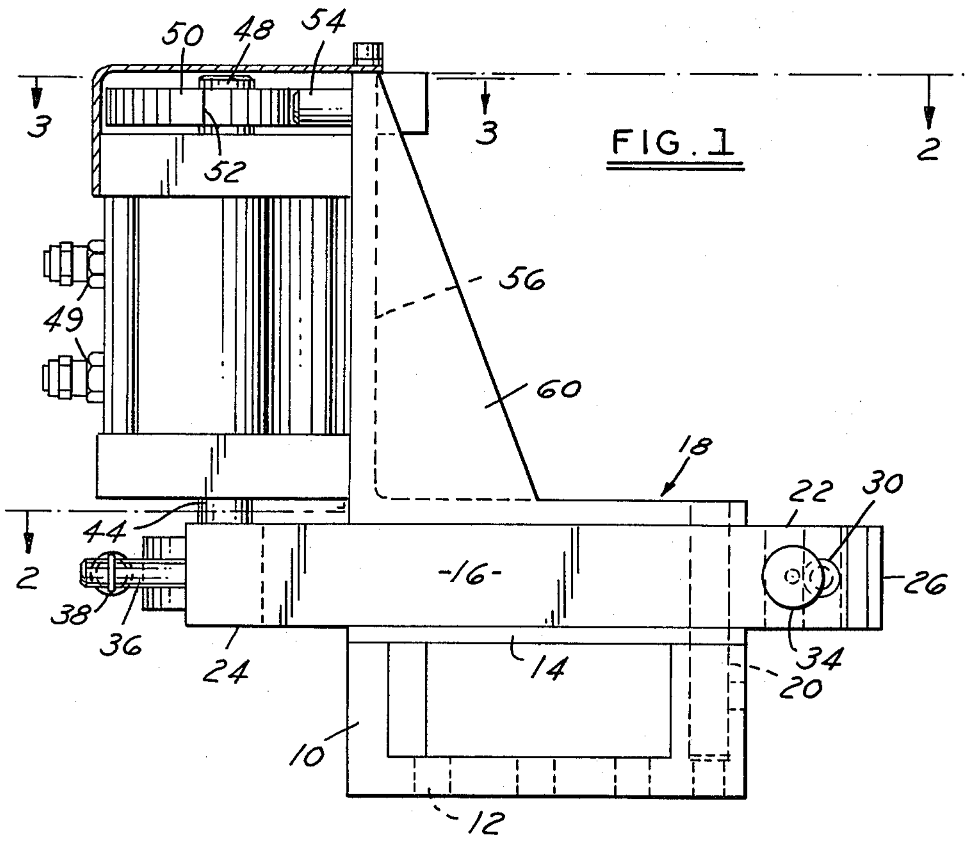
FIG. 1
FIG. 4
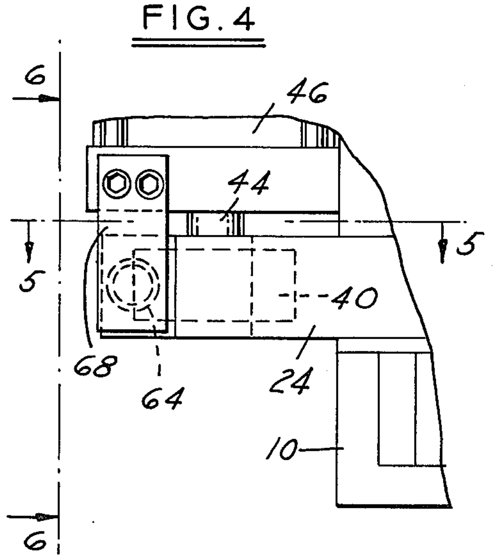
FIG. 5
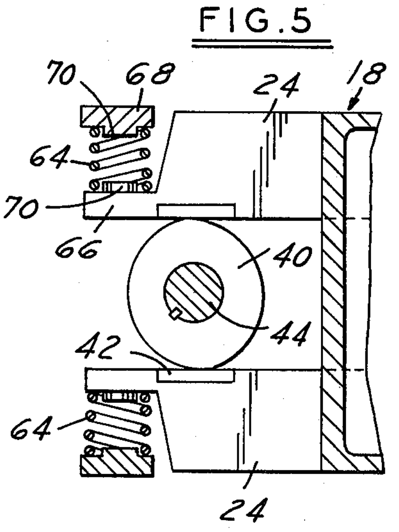

SELF-CENTERING FIXTURE

DESCRIPTION

1. Background of the Invention

This invention relates to a new and improved work holding fixture. More particularly, the invention relates to a device that will act as a self-centering fixture.

In the past the trade has used a large variety of fixtures for holding workpieces. However, none have been adequately suited for high production and yet allow quick changing to hold different size or shape workpieces while using a simple design. Inability to provide a firm grasp of the workpiece, while at the same time allowing for rapid change of the jaws for holding workpieces, has created a need in the industry for a new and better design.

2. Summary of the Invention

The present invention fills the void of the prior art. It makes use of a pair of levers pivoted to a base. Jaws on these levers are motor controlled to grasp a workpiece but are spring controlled to open if not held together by the motor. Each lever is comprised of unequal length arms so the force acting to separate the levers creates a proportionately greater clamping force between the jaws. A cam is situated between the levers to move the longer arms apart on rotation of the motor, while spring means are attached to the arms to hold them together against the cam.

DESCRIPTION OF DRAWINGS

FIG. 1 is a side elevation view of a fixture embodying the invention.

FIG. 4 is a partial side view of a modification in the cam area.

FIG. 5 is a partial cutaway view of the modification taken along line 5—5 of FIG. 4.

BRIEF DESCRIPTION OF PREFERRED EMBODIMENTS

Figure 2:
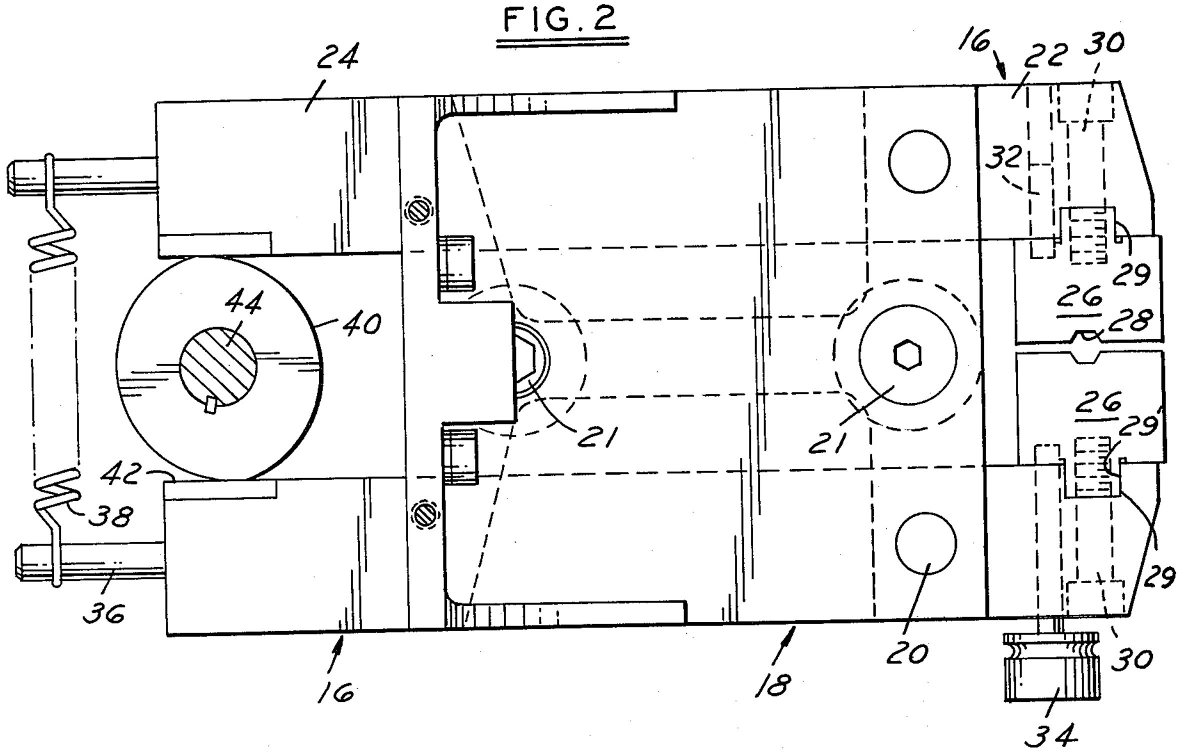
FIG. 2 is a view of the embodiment of FIG. 1 taken along line 2—2 in FIG. 1.
Figure 3:
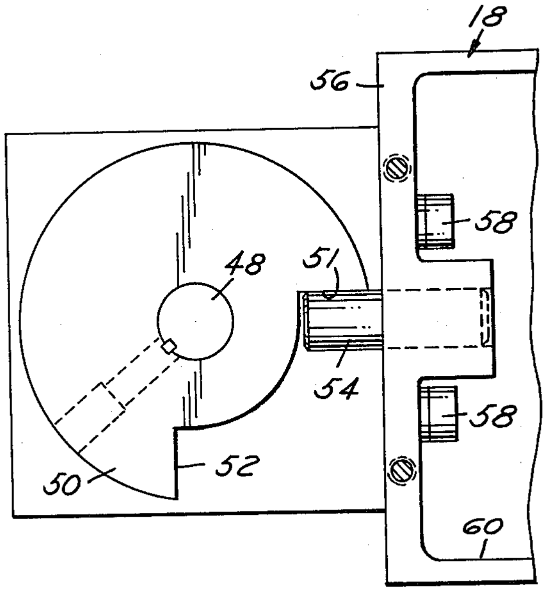
FIG. 3 is a partial view of the embodiment taken along line 3—3 of FIG. 1.
Figure 6:
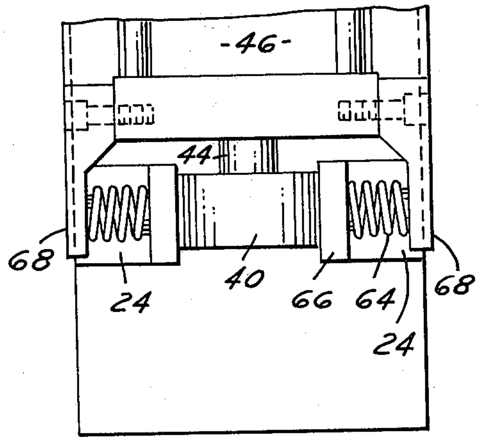
FIG. 6 is a partial rear view of the modification taken along line 6—6 of FIG. 4.

The present invention comprises a self-centering fixture for holding workpieces during machining operations. The fixture may be attached to a worktable or bench of a machine, or several of these fixtures may be mounted on a multi-station index table for vertical, angular or horizontal machining. Accordingly, there is provided a base portion 10 having a number of holes 12 to allow the fixture to be bolted to a table. On top of the base is placed a wear plate 14. A pair of levers 16 are pivotably positioned on the wear plate in a spaced apart substantially parallel arrangement. Overlying the levers is a top plate 18. The pivot pins 20 for the levers extend from the top plate through the wear plate into the base. The base and top plate are held together by bolts 21.

Each lever has a forward arm portion 22 and a substantially longer rear arm portion 24. Attached to each forward arm portion is one of a pair of opposing jaws 26. The clamping face of the jaw may be sculptured as at 28 to fit the workpiece to be clamped. The jaws are located on the levers by a key portion 29 interfitting with a keyway 29', a screw 30 and dowel pins 32 and 34, the latter one being removable. A knurled end 34' facilitates removal of the pin to permit easy change of the jaws.

At the end of the other arm portions 24 there are spring attachment means. These include pegs 36 attached to the rear end of each lever. These pegs are then joined by tension spring 38. This spring acts to pull the longer arms of the lever against the cam 40. The cam 40 between the rear ends of the lever counteracts the spring. The cam is irregular in shape so that the distance between the levers will vary upon rotation of the cam. Where the cam contacts the lever, there may be placed wear plates 42. The cam is keyed to the lower shaft portion 44 of a torque motor 46. The shaft extends through the torque motor with a second shaft portion 48 extending above the motor. The motor is air actuated from a suitable source through ports 49. The motor rotates upon pressurization. A suitable motor for this purpose is manufactured by ROTO ACTUATOR CORPORATION of 23919 Mack, St. Clair Shores, Mich., and is sold under the trademark TORK-MOR, as model DS-2-2.

On shaft portion 48 is stop member 50. The stop member has a pair of stop surfaces 50, 52 which can alternatively upon rotation of the shaft 28 abut dowel pin 54. This pin is anchored in an upright portion 56 of top plate 18. The upright portion, in addition to holding dowel pin 54, also supports the torque motor 46 in position above the levers. The motor is joined with top portion 56 by appropriate bolts 58. The top plate 18 includes a pair of gussets 60 between the top and lower portions of top plate 18 for added strength.

In operation, the fixture is anchored to a suitable work surface by bolts through holes 12 and the torque motor is connected to a suitable supply of air through ports 49. To begin use, the motor is rotated by air against the stop so that the minor axis A of the cam approaches the wear pads 42. Spring 38 holds the rear ends of the levers against the cam. This opens jaws 26 for placement of a workpiece therebetween. When the workpiece is in position, the air motor is pressurized in the opposite direction, causing the shaft to rotate the cam moving its major axis B toward the wear pads 42. The cam 40 has now increased the distance between the levers and thus jaws 46 are moved towards one another equally, thus securing the workpiece in position. The rotation continues until the force of the levers against the cam produces an equal and opposite moment to that produced by the air pressure in the motor. The force of the levers against the cam is proportional to the strength by which the jaws grasp the workpiece. Due to the longer length of rear arms 24 as compared to forward arms 22, a relatively small force is required to separate the rear arms, while creating a substantial clamping force at the jaws. If no workpiece was between the jaws rotation would stop when stop surface 52 abuts pin 54. The motor must be pressurized so long as clamping is desired. Following operation on the workpiece, the motor is again rotated by air to the open position. The spring in turn holds the longer lever arms against the cam 40 to release the workpiece.

An alternative embodiment of the invention may be obtained by replacing tension spring 38 with a pair of compression springs 64. With this modification, the spring pins 36 are removed and the rear of the lever is shaped to include a rearward extending platelike portion along the inner part of the lever. Joined to the housing of motor 46 are a pair of downward extending plates 68. The compression springs 64 are placed between each pair of plates to hold the levers against the cam 40. Suitable buttons 70 may be placed on these plates to retain the spring between the plates.

It will be apparent that by changing the shape of the cam the action of the levers may be varied to suit the particular application intended. Also, because the fixture uses cooperating self-centering jaws, machining operations of a greater variety may be performed on the workpiece than allowed by many prior art fixtures.

I claim:

1. A self-centering fixture comprising, in combination:

a base;

a pair of levers disposed substantially parallel to each other and pivoted to said base, each lever providing two arms of unequal length;

a jaw mounted on the shorter arm of each lever with the jaws facing each other between the levers to cooperatively clamp an article therebetween;

a rotary motor mounted on an upstanding portion of the base and having a rotary shaft extending beyond opposite ends of the motor and perpendicular to the plane of movement of the levers with one end of the shaft extending between the ends of the longer arms of the pair of levers and the other end of the shaft disposed remote from the levers but adjacent an upstanding portion of the base;

a rotary cam on said one end of the shaft to bear against the ends of the longer arms of the pair of levers and having a pair of diammetrically opposite high lobes and a pair of diammetrically opposite low lobes angularly displaced from the high lobes;

spring means for urging the arms against the lobes of the cam;

a rotary stop member mounted on said other end of the shaft and having a pair of stop faces angularly spaced apart similar to the angular displacement of the high and low lobes;

a stop pin mounted on the base adjacent the rotary stop member for engaging said stop faces to limit rotation of the shaft for stopping the same when the high and low lobes confront the levers;

said cam when rotated to bring the high lobes toward the levers causing the jaws to clamp an article therebetween and when rotated to bring the low lobe toward the levers causing an unclamping thereof;

each jaw having a key and each end of the shorter arm having a key way to receive the key; and a dowel pin extending between each jaw and the end of its respective arm disposed perpendicular to the direction of the key and key way, and a threaded fastener for each jaw extending substantially parallel to the dowel pin and engaging the jaw and respective end of the arm to retain the same against unintended separation.

2. The invention defined by claim 1 wherein the dowel pin in at least one of said jaws and the end of its respective arm being removable to facilitate removal of the jaw from the arm.

* * * * *